(12) United States Patent
Morel et al.

(10) Patent No.: US 6,456,026 B1
(45) Date of Patent: Sep. 24, 2002

(54) MAINTAINING, POSITIONING OR CLAMPING DEVICE

(75) Inventors: Michel Morel, Ermont; Patrice Roudier, Juziers, both of (FR)

(73) Assignee: Genus Technologies, Chatillon (FR)

( * ) Notice: Subject to any disclaimer, the term of this patent is extended or adjusted under 35 U.S.C. 154(b) by 0 days.

(21) Appl. No.: 09/647,146

(22) PCT Filed: Mar. 26, 1999

(86) PCT No.: PCT/FR99/00701

§ 371 (c)(1),
(2), (4) Date: Sep. 27, 2000

(87) PCT Pub. No.: WO99/50944

PCT Pub. Date: Oct. 7, 1999

(30) Foreign Application Priority Data

Mar. 27, 1998 (FR) .............................. 98 03800

(51) Int. Cl.⁷ ............................................. H02P 7/04
(52) U.S. Cl. ................. 318/362; 318/560; 318/469
(58) Field of Search ............... 318/466, 467, 318/560, 568.1, 568.16, 362, 469

(56) References Cited

U.S. PATENT DOCUMENTS

| | | | | |
|---|---|---|---|---|
| 3,819,998 A | * | 6/1974 | Yole ............................. 318/227 |
| 4,608,651 A | * | 8/1986 | Murakami et al. ......... 219/125.1 |
| 4,623,826 A | | 11/1986 | Benjamin et al. ............ 318/254 |
| 4,636,134 A | * | 1/1987 | Tellden ........................ 414/729 |
| 4,747,320 A | | 5/1988 | Nilsson ....................... 74/411.5 |
| 4,925,312 A | * | 5/1990 | Onaga et al. ............. 318/568.22 |
| 4,926,105 A | * | 5/1990 | Mischenko et al. .......... 318/800 |
| 4,970,448 A | * | 11/1990 | Torii et al. ................... 318/563 |
| 5,105,131 A | * | 4/1992 | Schap ........................... 318/282 |
| 5,155,423 A | * | 10/1992 | Karlen et al. ............. 318/568.1 |
| 5,193,647 A | * | 3/1993 | O'Brien, II ................ 184/40 R |
| 5,229,697 A | * | 7/1993 | Taylor et al. ................ 318/563 |
| 5,458,607 A | * | 10/1995 | Heintke et al. .............. 606/133 |
| 5,483,135 A | * | 1/1996 | Parks ........................... 318/469 |
| 5,486,759 A | * | 1/1996 | Seiler et al. ................. 324/207 |
| 5,524,541 A | | 6/1996 | Schwinn et al. ............. 101/484 |
| 5,543,692 A | * | 8/1996 | Howie et al. ................ 318/282 |
| 5,663,622 A | * | 9/1997 | Sekiguchi .................... 318/563 |
| 5,714,853 A | * | 3/1998 | Knab et al. .................. 318/265 |
| 5,754,017 A | * | 5/1998 | Tsuge et al. ................. 318/286 |
| 6,114,822 A | * | 9/2000 | Ubelein et al. .............. 318/469 |

FOREIGN PATENT DOCUMENTS

| | | |
|---|---|---|
| DE | 196 12 596 | 10/1997 |
| EP | 0 243 599 | 11/1987 |
| EP | 0 247 994 | 12/1987 |
| EP | 0 590 227 | 4/1994 |
| FR | 2 377 114 | 8/1978 |

* cited by examiner

Primary Examiner—Bentsu Ro
Assistant Examiner—Rita Leykin
(74) Attorney, Agent, or Firm—Young & Thompson (57) ABSTRACT

The invention concerns a maintaining, positioning or clamping device comprising at least a housing (18) containing a moving element (17) mobile in translation by the action of actuating means including an electric motor (11). The device comprises means for controlling and powering the electric motor (11), arranged to avoid powering the electric motor in a jamming position with risk of overheating and damaging the electric motor (11). The device is particularly useful for maintaining, positioning or clamping body parts.

10 Claims, 7 Drawing Sheets

MAINTAINING, POSITIONING OR CLAMPING DEVICE

The invention relates to a device for positioning, holding or gripping, comprising a positioning, holding or gripping mechanism actuated by a rotatable motor means such as an electric motor.

The invention is particularly useful for holding, positioning or gripping pieces of automobile body work, of the type comprising a housing containing a movable device movable in translation under the action of an actuating means.

U.S. Pat. No. 5,483,135 discloses a system and process for controlling the operation of vehicle glass, which is not usable for holding, positioning or gripping pieces of automobile bodies.

EP 0 243 599 discloses a device for holding, positioning or gripping, particularly for holding, positioning or gripping pieces of automobile body work, of the type comprising at least one housing containing a movable device movable in translation under the action of an actuating means comprising an electric motor.

The two first embodiments disclosed in EP 0 243 599 relate to mechanisms movable under the action of a rotatable electric motor, whilst the third embodiment described in EP 0 243 599 relates to a mechanism movable under the action of a linear electric motor.

The devices of EP 0 243 599 are hardly used in practice because of the risk of heating and electrical damage, in particular in a gripping position.

The invention has for its object to overcome the drawbacks of the prior art, by providing a new device comprising an electric motor of a particular type as well as control means of a particular type, whilst ensuring a precision and force of holding, positioning or gripping, comparable to the characteristics of the prior art.

The invention has for its object a device for holding, positioning or gripping particularly to hold, position or grip pieces of automobile body work, of the type comprising at least one housing containing a movable device movable in translation under the action of an actuating means comprising an electric motor, characterized in that the electric motor is a DC motor or a reversible motor equivalent adapted to carry out electrical braking, so as to immobilize the electric motor in a preliminary approach position to a full force position, the device comprises means for controlling and supplying the electrical motor, and in which the control means comprise means for position detection, so as to control the supply means for the electric motor as a function of the position detected by said means, to avoid supply of the electrical motor in a blocked position having the risk of overheating and damage to the electric motor.

According to other characteristics of the invention:
the control means comprise starting control means giving a start order to supply the electric motor, detection means of a position when arriving in abutment and means for memorizing this position of arriving at abutment as an initial reference position of the device, arranged in combination to start the device in a mechanically blocked or abutment position, the device comprises a modular assembly for supplying energy and for controlling the electric motor, connected to a rotation detector such as a rotatable coder, said modular assembly comprises a means for switching between several predetermined positions each corresponding to a path, an angle or a movement of a selected value to carry out a predetermined positioning, holding or gripping, the modular assembly for energy supply and controlling the electric motor comprises a memory adapted to memorize the position of the motorized mechanism during an actual cycle of operation, the modular assembly for supplying with energy and for control is adapted to compare an actual position of the motorized mechanism with a preceding position of the motorized mechanism, so as to detect an anomaly of operation of the device, the actuating means comprises a casing containing a pinion mounted and directly driven by the electric motor shaft, as well as a toothed wheel forming the nut for driving in translation a screw-threaded rod of the movable assembly, the actuating means is arranged to ensure a non-reversibility function or for holding in position the device upon stopping in the absence of electrical supply of the electrical means, said casing comprises a pierced closure plate or cover carrying on one side the electrical motor whose shaft extends through the hole in the closure plate or cover, so as to support said pinion from the side opposite that carrying the electric motor.

The invention will be better understood from the description which follows, given by way of non-limiting example, with reference to the accompanying drawings, in which.

Figures 1, 1A:
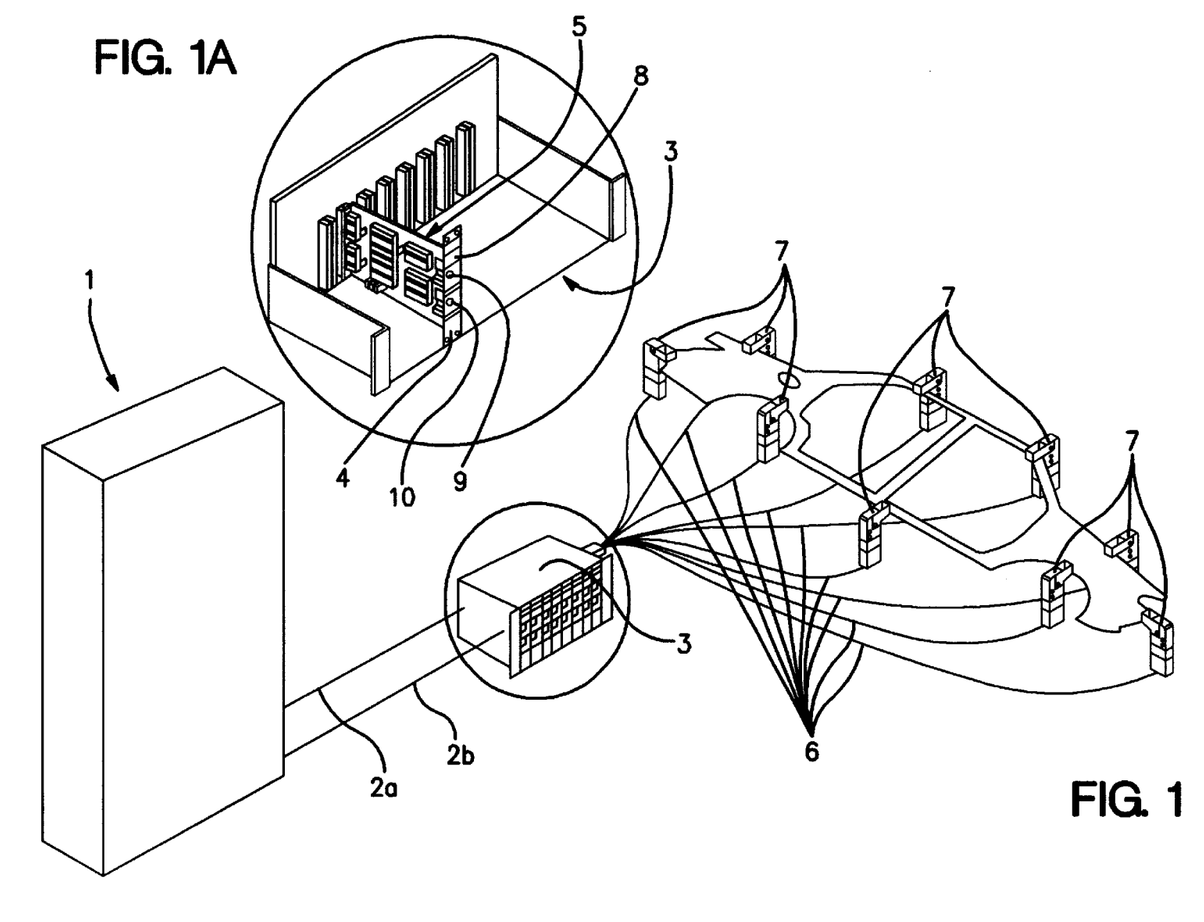
FIG. 1 schematically shows in perspective an assembly of devices according to the invention with partial enlargement of a box containing the modular assemblies.

With reference to FIG. 1, a control panel or a programmable computer 1 is connected by a wire connection 2a, 2b to a box 3 containing a plurality of modular assemblies 4. Each modular assembly 4 is preferably constituted by at least one electronic card 5 for controlling and supplying energy. The modular assemblies 4 contained in the box 3 are each individually connected by a wire 6 to motorized mechanisms 7 for holding, positioning or gripping. These motorized mechanisms 7 are well known to those skilled in the art and do not require more detailed description.

The invention described with reference to modular assemblies for supplying energy and controlling, contained in a box, is not limited to this embodiment, but also covers any variation in which the modular assembly 4 is integrated with the motorized mechanism, and constitutes a so-called "intelligent" mechanism controllable directly by the programmable computer or central control panel 1.

Each modular assembly 4 preferably comprises not only an electronic card 5, but also selection members or buttons 8, 9, 10 adapted to modify the speed of the mechanism, the direction of the mechanism or to pass from one type of operation to another type of operation.

Preferably, each motor means is associated with a detector of movement of the motor means; in the case of a rotatable motor means such as an electrical motor, there is preferably provided an associated rotation detector such as a rotatable coder, so as continuously to measure the number of turns or the rotation of the rotatable motor means.

The individual cards 5 associated each with a motorized mechanism 7 also preferably comprise a switch permitting isolating the programmable computer 1 or a central control panel, so as individually to carry out on the card 5 in question, the manipulations of opening, closing or starting, relative to the associated motorized mechanism 7.

As a modification, the mentioned switch could be replaced by an adjustment controlled by a computer program taking account of the values or pre-established program stored in a read only memory (ROM or EEPROM).

Preferably, the assembly of wire connections 2a, 2b or 6 could be replaced by a series connection, of the bus type, to connect the box 3 to the mechanism 7 and the programmable computer 1, with the help of a single material connection by means of an appropriate series communication protocol.

The filaments, cables, wires or buses for connection can be conductive connections or optical connections, making use of metallic conductors or optical fibers.

Each modular assembly 4 preferably comprises a means for switching between several predetermined positions each corresponding to a path, an angle or a movement of a selected value to carry out a predetermined positioning, holding or gripping.

The switching between two selected predetermined positions each corresponding to a different clearance of the motorized mechanism is carried out either manually or with a suitable member, for example a switch 9 accessible on the front face of the box 3, or on command of the programmable computer 1 following the reception of information on the following piece to be maintained positioned or gripped.

Figure 2:
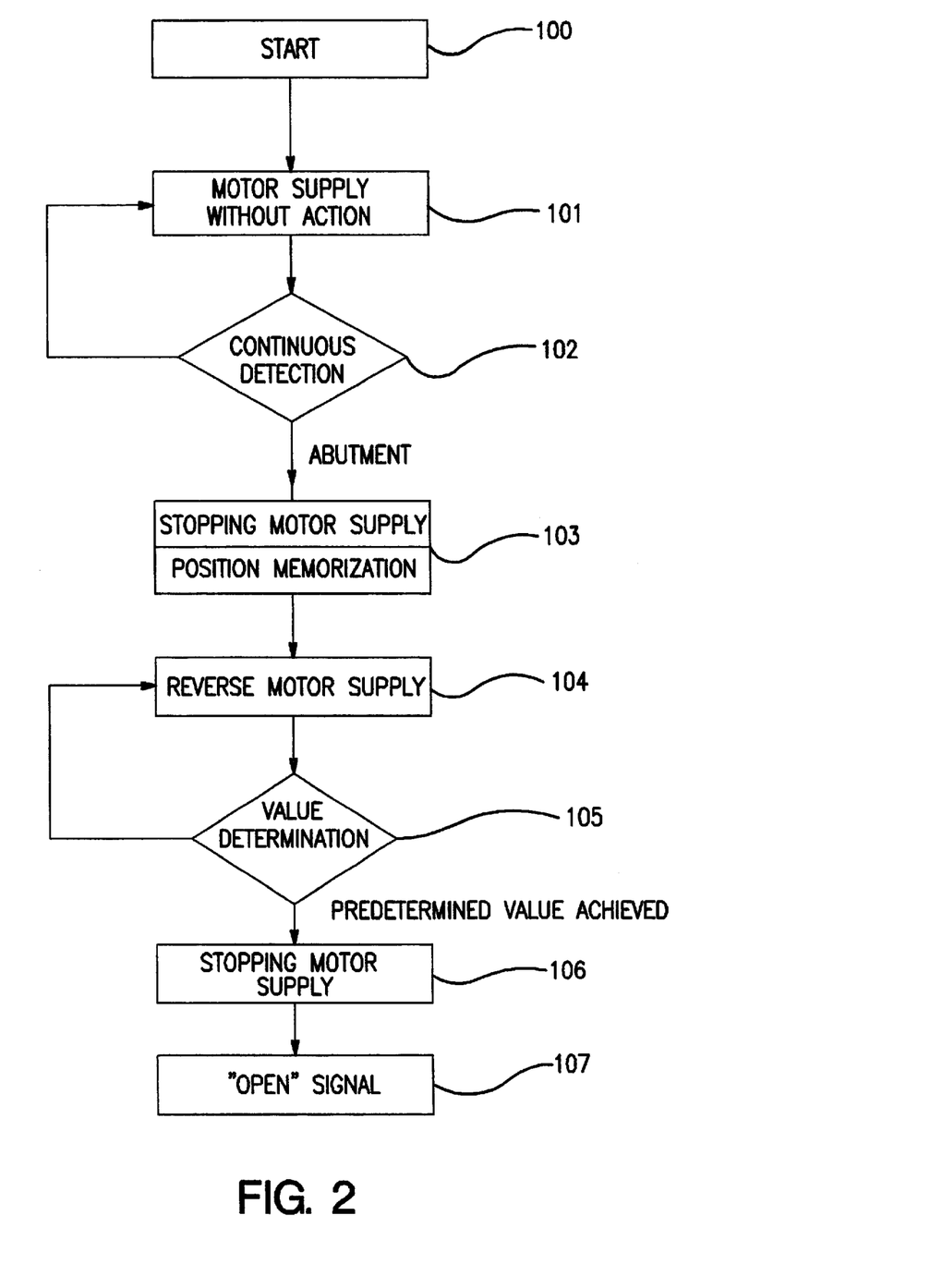
FIG. 2 shows schematically an organogram for starting the device according to the invention.

With reference to FIG. 2, the startup of a device according to the invention begins with a start order at a step 100 for starting control.

The starting control can be carried out with the help of a pushbutton in the front face of the box 3 or be transmitted by the programmable computer or central control panel 1.

Starting with the start order, the device for supplying the motor of a motorized mechanism 7 in a step 101 in the direction corresponding to the force of the device: it may for example be the closing of a gripper 7.

Continuous supply as well as arrival in the abutment position is not detected in a step 102, in which it is tested whether the device has arrived at an abutment position corresponding to the force of the device, for example for gripping a piece.

After this arrival in abutment, the supply to the motor is cut off in step 103 and this position is memorized as the initial reference position of the device.

In step 104, the motor is then supplied in the opposite direction, for example in the direction of opening the gripper, whilst measuring the rotation of the motor during this opening.

The rotation of the motor is controlled in step 105, and the motor continues to be supplied until a predetermined angle of rotation is reached.

In step 106, the supply of the motor is then cut off, and in step 107 there is emitted a signal indicating opening of the gripper, or freeing of the piece to be held or to be positioned, to the programmable computer or control panel 1.

Figure 3:
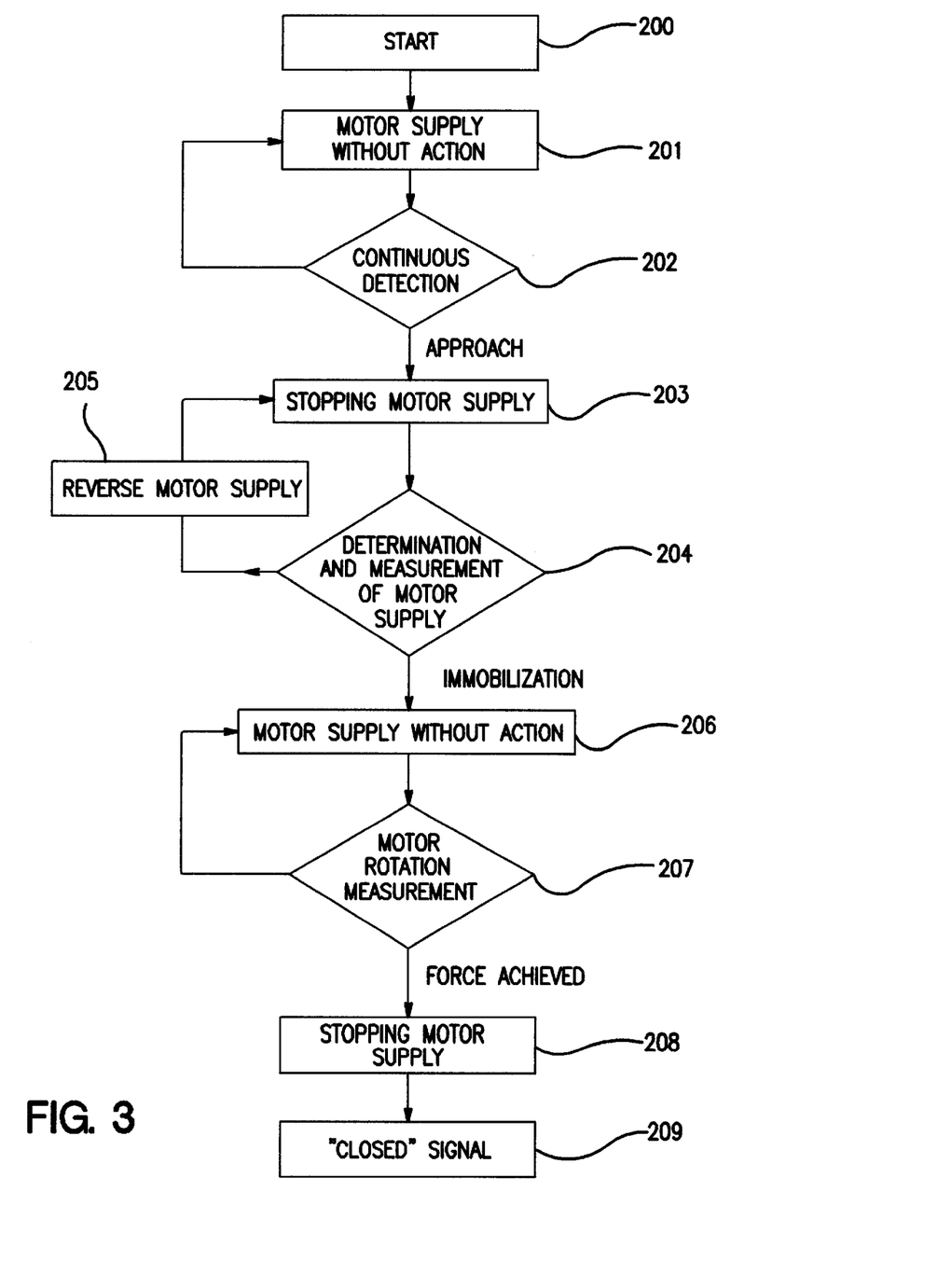
FIG. 3 shows schematically an organogram for holding, positioning or gripping a device according to the invention.

With reference to FIG. 3, the holding, positioning or gripping of a device according to the invention begins with a start order in a step 200 for controlling the start. The start order can be carried out manually or as a result of a signal transmitted by the programmable computer or central control panel.

From the start order, the device supplies the motor in the direction corresponding to the force of this device in a step 201: this may for example be the closing of a gripper 7.

The movement of the device is monitored during a step 202 so as continuously to determine whether a predetermined approach position has been reached or not, corresponding to a predetermined number of turns from the starting position.

After having reached the predetermined approach position, the supply of the motor is cut off in step 203, so as to be able to immobilize the motor.

In step 204, it is verified whether the motor is immobilized or if its speed is zero and subsequently a speed more than zero of the motor is initiated in a supply step 205 for the motor in the reverse direction, corresponding to electric braking of the motor.

After immobilization of the motor, we go to step 206 to carry out the remaining rotation until the full gripping force is achieved. To this end, the motor is again supplied in the effective direction of the device whilst determining, in step 207, whether the rotation of the motor has reached a predetermined value or whether the force of the device is reached, for example whether the gripping of the piece is achieved.

If the device reaches its full force, the supply of the motor is cut off in step 208.

Then, in step 209, there is emitted a corresponding "closed" signal, for example a signal of closing the gripper, to the programmable computer 1 or central control panel.

Figure 4:
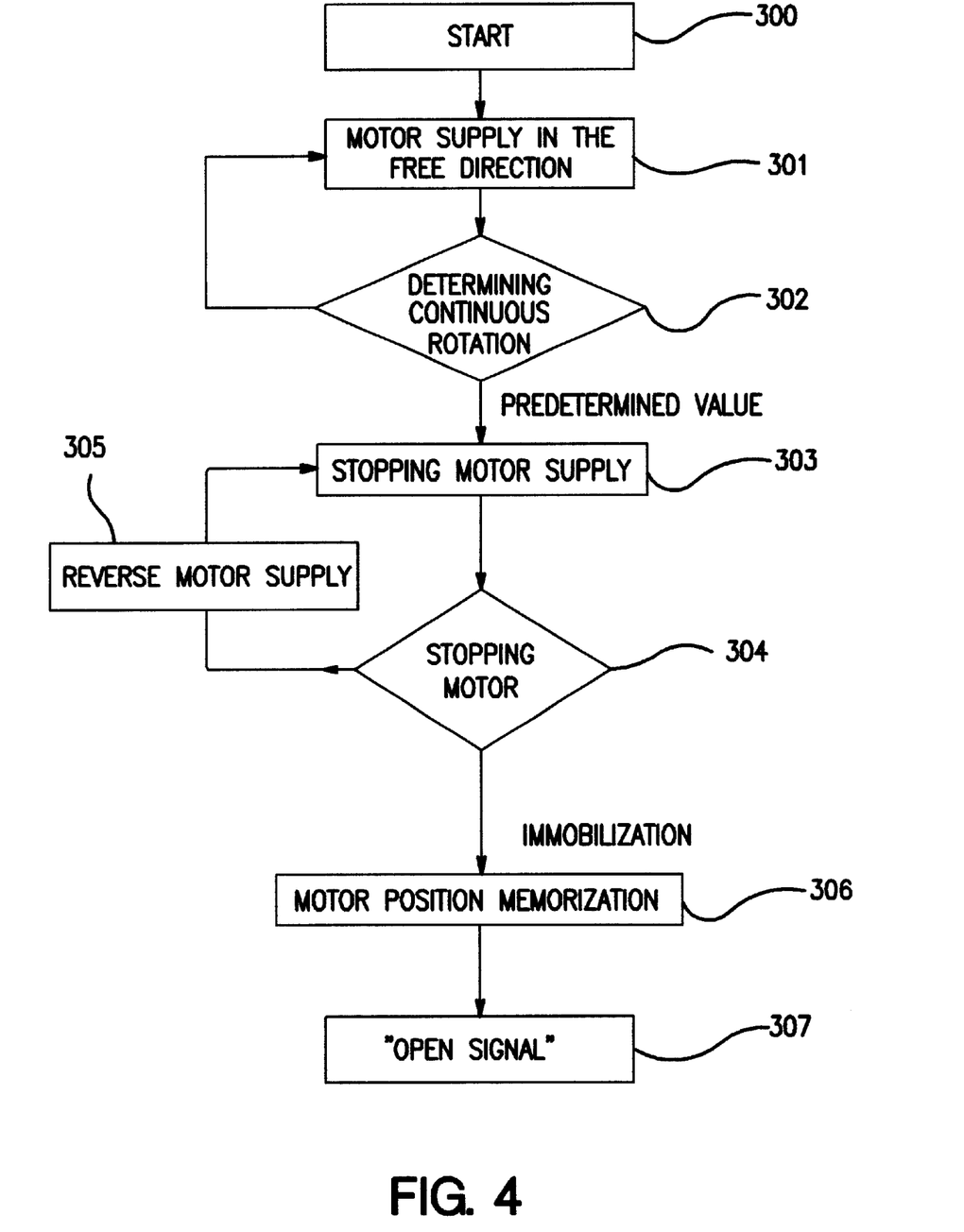
FIG. 4 shows schematically an organogram for freeing or loosening a device according to the invention.

With reference to FIG. 4, the opening of a device according to the invention begins with a start order in a step 300, for controlling the start, manually triggered or by a signal emitted by a programmable computer 1 or a central control panel.

The motor is then continuously supplied in the direction of freeing, or of ungripping of the device, in a step 301, whilst carrying out a continuous monitoring of rotation of the motor in a step 302.

When the predetermined value of freeing or ungripping is reached and detected in step 302, we go immediately to step 303 for stopping the supply of the motor.

In step 304, it is then verified whether the motor has stopped, after possible braking of the motor by supply of the motor in the reverse direction in an auxiliary step 305.

When the verification of step 304 permits determining the immobilization of the motor, we go to step 306 for memorizing the position of the motor, then in 307 there is emitted a signal for opening, freeing or ungripping the device, to the programmable computer 1 or central control panel.

Figure 5:
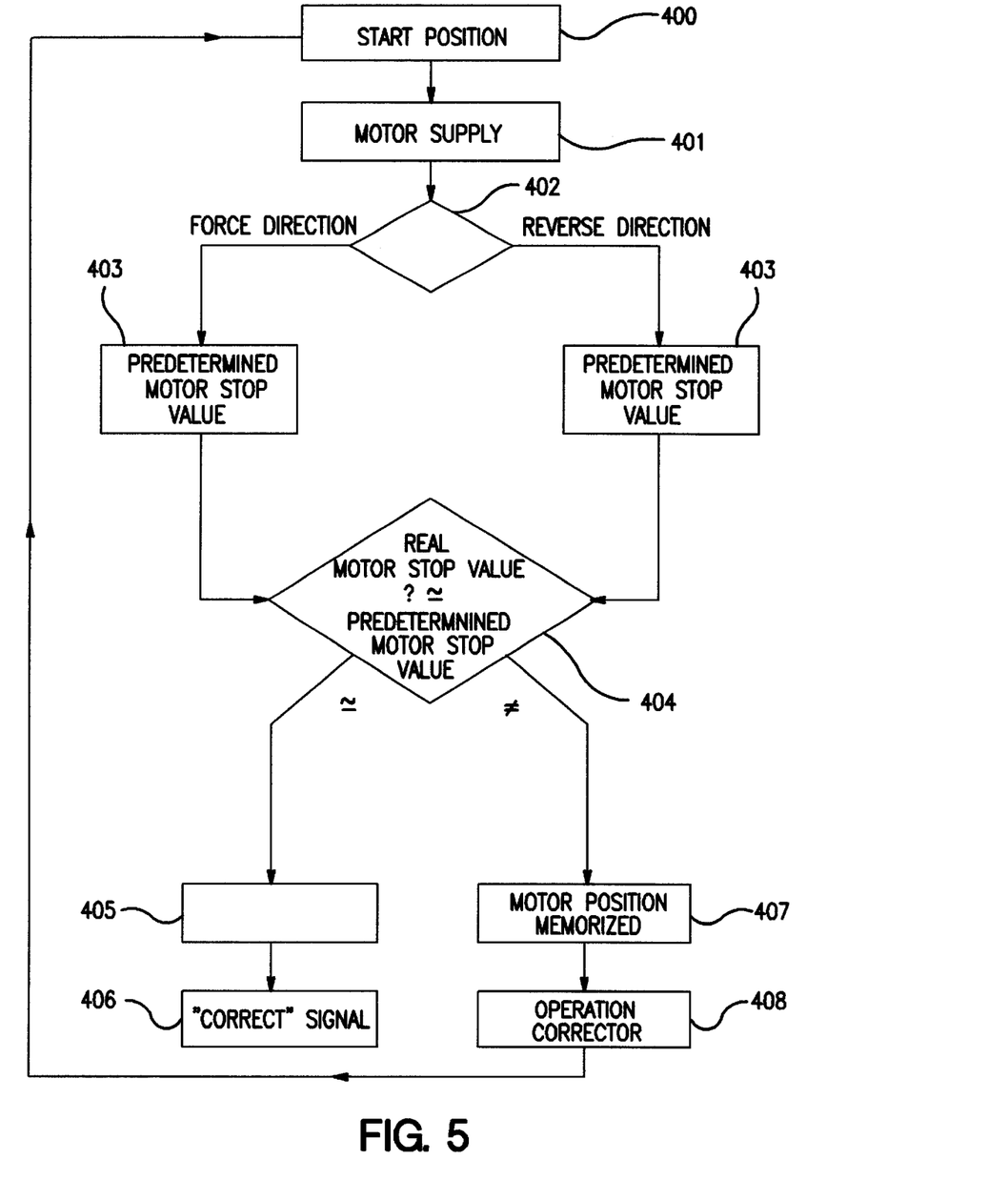
FIG. 5 shows schematically an organogram for detecting an incident in a device according to the invention.

With reference to FIG. 5, the event of detecting the operation of a device according to the invention corresponds to a continuous observation of the operation of the device from a starting step 400 that can correspond to a step 200 of FIG. 3 or a step 300 of FIG. 4.

From the starting step 400 mentioned above, and from the corresponding position memorized for this purpose in the modular assembly, the supply of the motor is carried out in the direction corresponding to the desired operation of the device, in step 401.

A test is carried out step 402 to determine, as a function of the direction of supply of the motor and the starting position, what is the desired value of the position of the motor corresponding to a next stop.

This foretold value corresponding to the stop position of the motor is memorized in step 403 in a memory.

There is then carried out a comparison, in step 404, between the real stop value of the motor and the foretold value.

If the real value of the stop position of the motor is substantially identical to the foretold value of the stop position of the motor, we pass to step 405 corresponding to a determination of correct operation, and if desired emit in a step 406 a signal of correct operation.

If the difference between the real value of the stop position of the motor and the foretold value of the stop position of the motor exceeds a predetermined limit, we go to step 407 for incorrect operation of the motor and the incorrect position of the motor is memorized in this step 407 before carrying out a process described with reference to FIG. 3 or a process described with reference to FIG. 4, so as to facilitate the retraction of the obstacle or the undesirable abutment impairing the good operation of the device.

There is carried out in step 408 the corrective operation of the mentioned device and the anomaly of the device is corrected by an automatic or manual intervention.

After correction of the anomaly, the continuous surveillance of the operation of the device begins again in step 400 corresponding to a memorized start position of the preceding cycle.

The comparison between successive cycles of operation of the device thus permits taking account of the wear of the mechanism and to compensate the progressive operating offset which is produced to the extent that the mechanisms wear.

Moreover, the memorization of the position of the motor in case of an anomaly permits not accidentally freeing a piece held or gripped, particularly in the case of accidental cutoff of the energy that can lead to an undesirable modification of the position of the device.

Anomaly detection ensures the safety of the personnel and permits the disengagement of a member held by the device, by reversing the operation of the device, as described with reference to steps 407 and 408.

Even in the case in which auxiliary manual unblocking means are provided, either for the rotatable coder, or on a transmission member connected to a gear train or directly to the mechanism in question, the continuous registration of the position of the device thanks to the rotatable coder permits knowing the real position of the device and avoiding transmitting contradictory signals to the central control panel or programmable computer 1, as well as receiving signals that do not correspond to the cycle in question.

This arrangement thus avoids accidental operations that may give rise to risk for the personnel and the surroundings.

Figure 6:
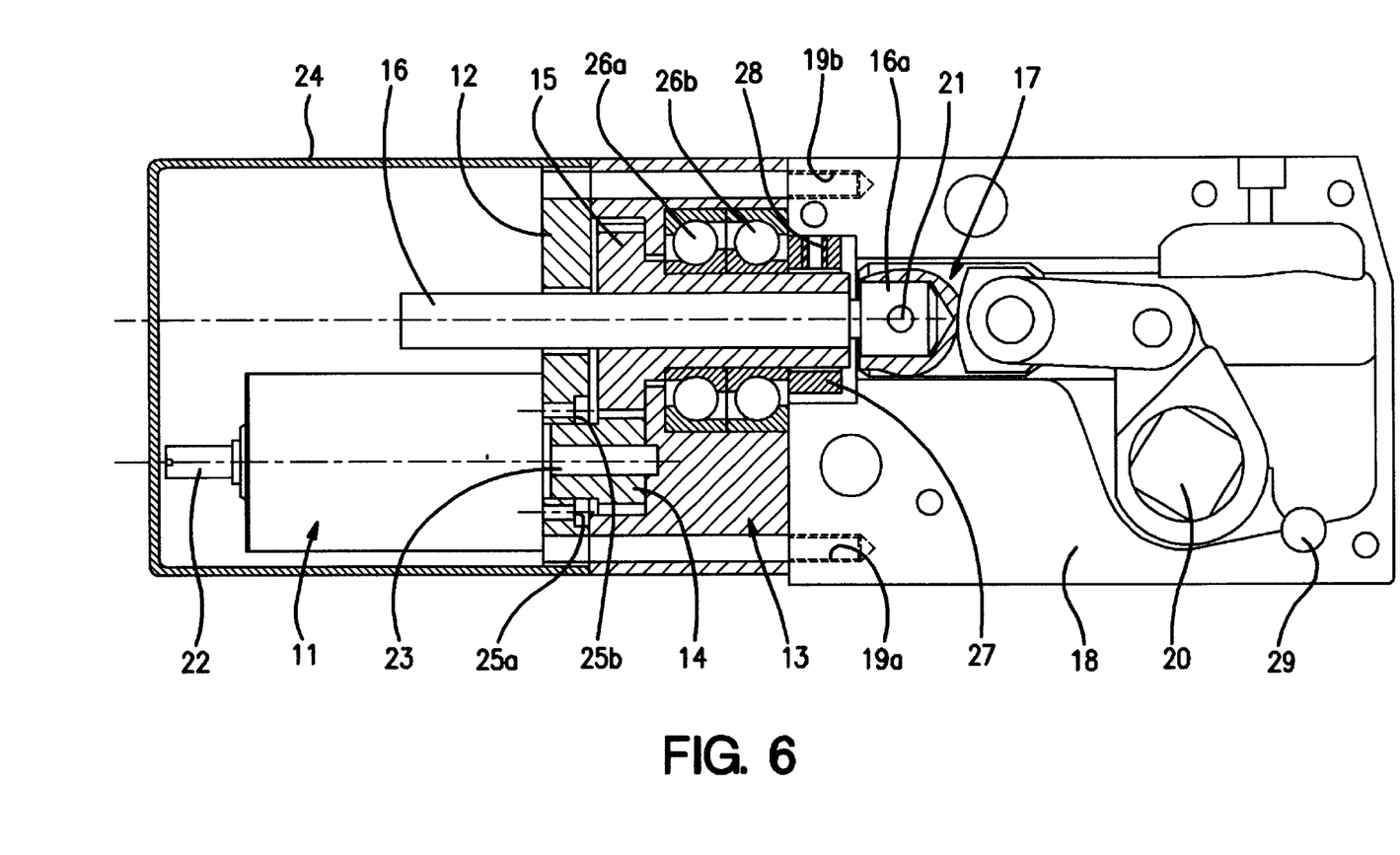
FIG. 6 shows schematically a view partially in cross-section on the longitudinal plane of symmetry of a device according to the invention in the open position.
Figure 7:
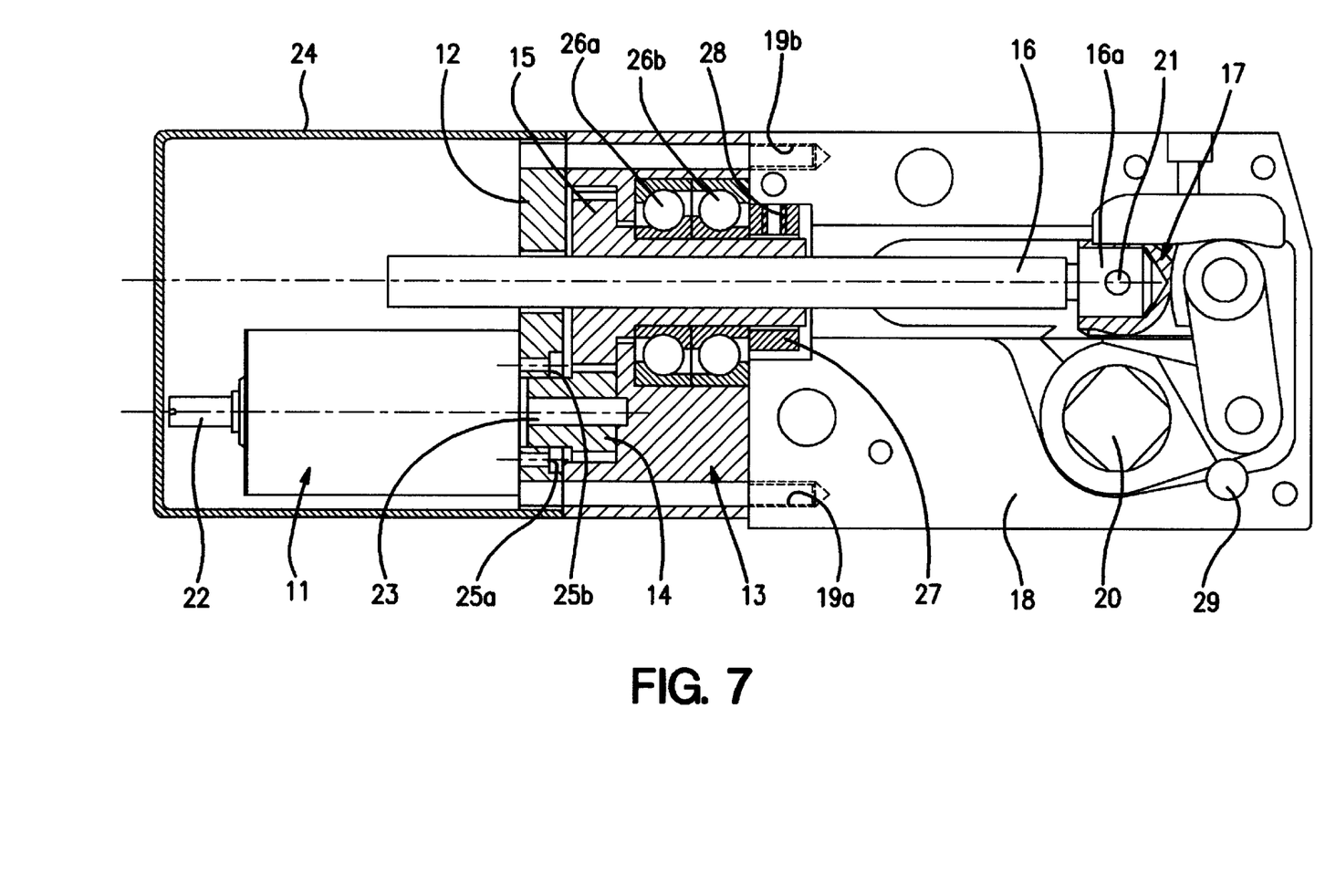
FIG. 7 shows schematically a view in fragmentary longitudinal cross-section of a device according to the invention in the closed position adjacent the end of course abutment.

With reference to FIGS. 6 and 7, identical reference numerals designate identical or functionally equivalent elements.

The device comprises an electric motor 11 mounted on a closure plate 12 or a cover of casing 13 containing a pinion 14 engaging with the toothed wheel 15 forming the translatory drive nut of a screw-threaded rod 16 of a device 17 movable in translation. The casing 13 is mounted at the end of the housing 18 containing the equipment 17 that is movable in translation by means of the screw (not shown) that screws into cappings 19a, 19b in the housing 18.

In the case of a mechanism, for example a shaped ramp, the mechanism is for example adapted to maintain or grip the pieces by means of a gripping arm (not shown) secured to the drive squared member 20, in a manner analogous to the operation of the device described in French application FR 2.769.255.

The construction of the housing 18 by assembly of two symmetrical shells relative to the longitudinal joint plane and of the mechanism driven by the mobile assembly 17, is of a type known per se and does not required a more detailed description.

The screw-threaded rod 16, preferably with a trapezoidal thread, has a head 16a fixed by anti-rotation mounting to the mobile assembly 17 for example by means of an axle 21 passing through the head 16a and the mobile assembly 17.

The motor 11 is preferably a motor with two shaft ends 22 and 23: the shaft end 22 permits in case of malfunction mechanical driving of the device after having removed the protective cap 24; whilst the shaft end 23 is secured to the pinion 14 directly to drive the pinion 14 engaging with an external toothed wheel of the drive nut 15.

Preferably, the cover 12 of the casing 13 is fixed to the casing 13 by fixation screws of the casing 13 also ensuring the securement to the housing 18 by screwing in the tappings 19a, 19b: this arrangement permits reducing the overall size of the device and ensures economical production and simple mounting. The cover 12 also preferably comprises several recesses 25a, 25b for the securement screws of the motor 11 to the cover 12.

The drive nut 15 of the screw-threaded rod 16 is externally shaped as a toothed wheel coacting with the pinion 14; this nut 15 is rotatably mounted in the casing 13 by means of two roller bearings 26a, 26b gripped by a terminal screw 27 blocked by a set screw engaged in the radial tapping 28. During operation of the electric motor, the shaft end 23 drives its integral pinion 14 engaging with the nut 15 for driving in translation the screw-threaded rod 16 of the movable assembly 17, which causes the passage from the open position of FIG. 6 to the position of FIG. 7 near the closing and the contact of the rod of the knee with the abutment 29 of the end of the device.

The mechanical structure of the device according to the invention is particularly simple, because the cover 12 of the casing 13 carries the electric motor 11, on the one hand, the drive pinion 14 on the other hand mounted on the shaft 23 passing through the electric motor; whilst the casing 13 contains the drive nut 15 maintained in position by the gripping nut 27 adjustable or removable from outside said casing 13: the device according to the invention is easily assembleable and disassembleable from the three distinct modules forming respectively a cover module, a casing module, and a housing module ensuring the function of holding, positioning or gripping. As a result, the invention is applicable not only to grippers, but also to all similar devices, for example to the positioning devices known as "guide carriers".

A rotatable coder (not shown in FIGS. 6 and 7) can be mounted either on the screw-threaded rod 16 or on the undershaft 22, so as continuously to measure the rotation of the rotatable motor means 11 or of the rod 16.

Preferably, there is used as an electric motor, a DC motor with a relatively high speed of rotation, for example of the order of 3000 rpm, which, given a reduction ratio less than 1 and preferably adjacent one half, would drive the toothed wheel 15 forming the nut for driving in translation, a speed of the order of 1500 rpm.

Also preferably, the actuating means is arranged to ensure non-reversible operation or to hold in position the device in the stopped condition in the absence of electrical supply to the motor 11: it suffices simply to provide for this purpose that the slope of the trapezoidal screw thread of the screw-threaded rod (16) be sufficiently small that the drive will not be reversible, but on the contrary self-braking.

The invention described with reference to one particular embodiment is not in any way limited, but covers on the contrary any modification or shape and any variation of embodiment within the scope and spirit of the invention.

The use of a device according to the invention as a robot clamp or prehensile member is also covered by the present invention.

What is claimed is:

1. Device for holding, positioning or gripping pieces of automotive body work, comprising at least one housing (18) comprising a mobile device (17) movable in translation under the influence of at least one actuating means comprising an electric motor (11), characterized in that the electric motor is a reversible motor adapted to carry out electrical braking, so as to stop the electric motor, in that the device comprises means for controlling and supplying the electric motor (11), and in that the control means comprise means for detecting the position of the motor, so as to control the supply means for the electric motor (11) as a function of the position detected by said position detecting means, to avoid supply of the electric motor (11) in a blocked position thereby to avoid overheating of the electrical motor (11).

2. Device according to claim 1, characterized in that the control means comprise starting control means (100) giving a start order to supply (101) the electrical motor, detection means (102) for a position of arrival in abutment and memorization means (103) of this position of arrival in abutment as an initial reference position of the device, arranged in combination to initiate (100–107) the device in a mechanical blockage or abutment position.

3. Device according to claim 1, characterized by the fact that the device comprises a modular assembly (4) for energy supply and control of the electrical motor connected to a rotation detector.

4. Device according to claim 3, characterized in that said modular assembly (4) comprises a means for switching between several predetermined position each corresponding to a path, an angle or a movement of a value selected to carry out a predetermined positioning, a holding or a gripping.

5. Device according to claim 4, characterized in that the modular assembly for energy supply and for control of the electrical motor (11) comprises a memory adapted to memorize the position of the motorized mechanism (7) during an actual operating cycle.

6. Device according to claim 4, characterized in that the modular assembly for energy supply and control of the rotatable motor means comprises a memory adapted to memorize the position of the motorized mechanism during a preceding operating cycle.

7. Device according to claim 5, characterized in that the modular assembly (4) for supplying energy and controlling is adapted to compare an actual position of the motorized mechanism (7) with a preceding position of the motorized mechanism, so as to detect an anomaly in operation of the device.

8. Device according to claim 1, characterized in that the actuating means comprises a casing (13) containing a pinion (14) mounted and driven directly by the shaft (23) of the electric motor (11), as well as a toothed wheel (15) forming a drive nut in translation for a screw-threaded rod (16) of the mobile assembly (17).

9. Device according to claim 8, characterized in that the actuating means is arranged to ensure a non-reversible operation or to hold in position the stopped device in the absence of electrical supply of the electric motor (11).

10. Device according to claim 8, characterized in that said casing (13) comprises a closure plate or a pierced cover (12) bearing on the one side the electrical motor (11) whose shaft (13) extends through the piercing of the closure plate (12) or cover, so as to support said pinion (14) on the side opposite the side bearing the electric motor (11).

* * * * *